Patented Dec. 24, 1940

2,226,198

UNITED STATES PATENT OFFICE 2,226,198

AZO DYE COMPOUNDS AND MATERIAL COLORED THEREWITH

Joseph B. Dickey and John R. Byers, Jr., Rochester, N. Y., assignors to Eastman Kodak Company, Rochester, N. Y., a corporation of New Jersey No Drawing. Application December 31, 1938, Serial No. 248,872

8 Claims. (Cl. 260—152)

This invention relates to the art of dyeing or coloring. More particularly, it relates to new azo dye compounds and the application of the nuclear non-sulfonated compounds for the coloration of organic derivatives of cellulose, particularly textile materials made of or containing an organic derivative of cellulose, by dyeing, printing, stenciling, or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of our invention to provide a new class of azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The azo dye compounds of our invention have the general formula:

$$R-N=N-R_3$$

wherein R represents the residue of an aromatic nucleus, and $R_3$ represents the residue of a member selected from the group consisting of a tetronic acid and a tetramic acid.

While our invention relates to azo dye compounds having the general formula just given, it relates more particularly to the azo dye compounds having the general formulae:

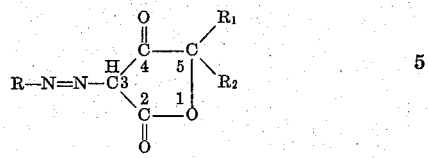

and

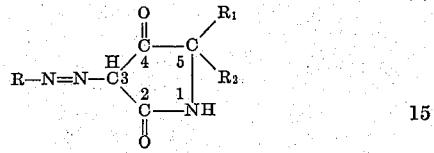

wherein R represents the residue of an aromatic nucleus and $R_1$ and $R_2$ each represents a member selected from the group consisting of hydrogen, an alkyl group, an allyl group, an aryl group, a cycloalkyl group and a heterocyclic group.

It will be understood that alkyl as used herein, unless otherwise stated, includes not only unsubstituted alkyl groups such as a methyl group, an ethyl group or a propyl group, but also substituted alkyl groups such as β-hydroxyethyl, β,γ-hydoxyl propyl β-methoxyethyl or β-ethoxyethyl, for example. Similarly the expressions, a tetronic acid and a tetramic acid, include unsubstituted tetronic acid and unsubstituted tetramic acid as well as substituted tetronic acid and substituted tetramic acid as clearly shown hereinafter.

The azo dye compounds of our invention can be prepared by diazotizing a primary aromatic amine and coupling the diazonium compound obtained with a tetronic acid or a tetramic acid. Coupling occurs in the 3-position of the tetronic or tetramic acid coupling component and it will be understood that no substituent which would prevent coupling should be present in the 3-position.

As previously indicated, the nuclear non-sulfonated azo dye compounds of our invention constitute valuable dyes for the coloration of organic derivatives of cellulose, such as those hereinbefore mentioned, yielding various shades thereon of good fastness to light and washing. These nuclear non-sulfonated dye compounds likewise possess application for the dyeing of wool and silk and yield generally similar shades on these materials as on organic derivatives of cellulose. Compounds in which the aromatic nucleus designated R contains a nuclear sulfonic acid group can likewise be prepared in known fashion. These compounds possess little or no utility for the coloration of organic derivatives of cellulose but can be employed to color textile materials such as wool and silk, yielding various shades thereon. For the dyeing of organic derivatives of cellulose such as cellulose acetate silk, nuclear non-sulfonated compounds wherein R is a phenyl residue are generally advantageous. Said phenyl nucleus may be substituted as clearly indicated herein.

The following examples illustrate the preparation of the azo dye compounds of our invention:

*Example 1*

12.3 grams of o-anisidine are dissolved in 200 cc. of water containing 30 cc. of 36% hydrochloric acid. The solution resulting is then cooled by the addition of ice, or in any manner desired, to about 0–5° C. and the o-anisidine is diazotized by the addition, with stirring, of 6.9 grams of sodium nitrite dissolved in water while maintaining the temperature at about 0–5° C.

10 grams of tetronic acid are dissolved in a dilute aqueous sodium carbonate solution, the resulting solution is cooled to a temperature approximating 0–10° C. and the diazo solution prepared as described above is slowly added with stirring. Upon completion of the coupling reaction which takes place, the dye compound formed is precipitated by making the mixture acid to litmus by the addition of a mineral acid such as hydrochloric acid. The dye compound is recovered by filtration, washed with water and dried. The dye compound obtained in accordance with this example colors cellulose acetate silk, wool and silk, a greenish-yellow shade from an aqueous suspension of the dye.

*Example 2*

13.8 grams of o-nitroaniline are diazotized and the diazonium compound obtained is coupled with 12.8 grams of 5,5-dimethyltetramic acid. The diazotization, coupling and recovery of the dye compound formed may be carried out in accordance with the methods described in Example 1. The dye compound obtained colors cellulose acetate silk, wool and silk, a greenish-yellow shade.

*Example 3*

17.3 grams of 1-amino-2-chloro-4-nitrobenzene are diazotized in the usual manner and the diazonium compound obtained is coupled with 17.6 grams of 5-phenyltetronic acid. The coupling and recovery of the dye compound may be carried out as described in Example 1. The dye compound obtained colors cellulose acetate silk, wool and silk, a greenish-yellow shade.

*Example 4*

15.2 grams of 1-amino-2-methyl-4-nitrobenzene are diazotized in the usual manner and the diazonium compound obtained is coupled with 17 grams of 5-tetrahydrofuryltetronic acid. The coupling and recovery of the dye compound may be carried out as described in Example 1. The dye compound obtained colors cellulose acetate silk, wool and silk, a greenish-yellow shade.

*Example 5*

22 grams of 3-nitro-4-aminophenylmethyl sulfone are diazotized in the usual manner and the diazonium compound obtained is coupled with 18.2 grams of 5-cyclohexyltetramic acid. The coupling and recovery of the dye compound may be carried out as described in Example 1. The dye compound obtained colors cellulose acetate silk, wool and silk, a greenish-yellow shade.

*Example 6*

24 grams of the sodium salt of 2-amino-5-nitrobenzene sulfonic acid are diazotized in known manner and the diazonium compound obtained is coupled with 22.6 grams of 5-α-naphthyl tetronic acid. The coupling reaction may be carried out as described in Example 1. The dye compound formed is precipitated by the addition of sodium chloride, recovered by filtration and dried. The dye compound thus obtained colors silk and wool a yellow shade from its aqueous solution.

The following tabulation further illustrates the compounds employed in the process of our invention together with the color they produce on cellulose acetate silk, wool and silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 6 inclusive.

| Amine | Coupling component | Color on cellulose acetate silk, wool and silk |
|---|---|---|
| Aniline | 1. Tetronic acid | Greenish-yellow. |
|  | 2. Tetramic acid | Do. |
|  | 3. 5-methyl tetronic acid | Do. |
|  | 4. 5-ethyl tetramic acid | Do. |
|  | 5. 5-phenyl tetronic acid | Do. |
|  | 6. 5-cetyl tetronic acid | Do. |
|  | 7. 5,5-dimethyl tetronic acid | Do. |
|  | 8. 5-cyclohexyl tetronic acid | Do. |
|  | 9. 5-tetrahydrofuryl tetramic acid | Do. |
|  | 10. 5-methyl-5-allyl tetramic acid | Do. |
|  | 11. 5-propyl tetronic acid | Do. |
|  | 12. 5-furfuryl tetronic acid | Do. |
|  | 13. 5-allyl tetronic acid | Do. |
| o-Anisidine | 1–13 above | Do. |
| m-Anisidine | 1–13 above | Do. |
| p-Anisidine | 1–13 above | Do. |
| o-Phenetidine | 1–13 above | Do. |
| m-Phenetidine | 1–13 above | Do. |
| p-Phenetidine | 1–13 above | Do. |
| o-β-Methoxyethoxyaniline | 1–13 above | Do. |
| m-β-Methoxyethoxyaniline | 1–13 above | Do. |
| p-β-Methoxyethoxyaniline | 1–13 above | Do. |
| o-β-Hydroxyethoxyaniline | 1–13 above | Do. |
| m-β-Hydroxyethoxyaniline | 1–13 above | Do. |
| p-β-Hydroxyethoxyaniline | 1–13 above | Do. |
| o-Nitroaniline | 1–13 above | Do. |
| m-Nitroaniline | 1–13 above | Do. |
| p-Nitroaniline | 1–13 above | Do. |
| 1-amino-2-nitro-4-methyl-benzene | 1–13 above | Do. |
| 1-amino-2-nitro-4-methoxy-benzene | 1–13 above | Do. |
| 1-amino-2-nitro-4-(F, Cl, Br, I) benzene | 1–13 above | Do. |

| | Amine | Coupling component | Color on cellulose acetate silk, wool and silk |
|---|---|---|---|
| | 1-amino-2-methyl-4-nitrobenzene | 1-13 above | Greenish-yellow. |
| | 2-amino-5-nitrophenylmethylsulfone | 1-13 above | Do. |
| | 5-amino-2-nitrophenylmethylsulfone | 1-13 above | Do. |
| | o-Aminobenzamide | 1-13 above | Do. |
| | p-Aminoacetophenone | 1-13 above | Do. |
| | 2-amino-6-methoxybenzothiazole | 1-13 above | Do. |
| | Dianisidine | 1-13 above | Do. |
| | p-Aminoazobenzene | 1-13 above | Orange-yellow. |
| | p-Aminodimethylaniline | 1-13 above | Red. |

The diazo compound of 5-nitro-2-aminobenzene sulphonic acid when coupled with the coupling compounds listed in the tabulation above gives dye compounds which color silk and wool a greenish-yellow shade.

By coupling the diazo compounds of the amines listed above, for example, with tetronic acid or tetramic acid substituted in the 5-position with a sulphonated phenyl nucleus, azo dye compounds can be obtained which color silk and wool the colors indicated above in the tabulation.

In order that the preparation of the azo dye compounds of our invention may be clearly understood it is here noted that a number of the tetronic and tetramic acid coupling components are described in Liebig's Annalen, volume 368, page 62 (1909). The preparation of tetronic acid and tetramic acid, for example, is specifically described in this reference. Substituents may be introduced into the 5-position of the tetronic acid nucleus or the tetramic acid nucleus by methods customarily employed for the introduction of the desired substituents.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to U. S. Letters Patent No. 2,115,030, issued April 26, 1938.

We claim:

1. The azo dye compounds having the general formula:

$$R-N=N-R_3$$

wherein R represents the residue of an aryl nucleus of the benzene series and $R_3$ represents the residue of a tetramic acid.

2. The azo dye compounds having the general formula:

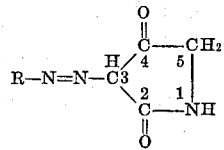

wherein R represents the residue of an aryl nucleus of the benzene series and wherein each of the hydrogen atoms in the position numbered 5 may be replaced by an alkyl group.

3. Material made of or containing an organic derivative of cellulose and in which said organic derivative of cellulose is colored with a nuclear non-sulfonated azo dye compound having the general formula:

$$R-N=N-R_3$$

wherein R represents the residue of a member selected from the group consisting of an aryl nucleus of the benzene series and a benzothiazole nucleus, and $R_3$ represents the residue of a member selected from the group consisting of a tetronic and a tetramic acid.

4. Material made of or containing an organic derivative of cellulose and in which said organic derivative of cellulose is colored with a nuclear non-sulfonated azo dye compound having the general formula:

$$R-N=N-R_3$$

wherein R represents the residue of an aryl nucleus of the benzene series and $R_3$ represents the residue of a member selected from the group consisting of a tetronic acid and a tetramic acid.

5. A cellulose acetate colored with a nuclear non-sulfonated azo dye compound having the general formula:

$$R-N=N-R_3$$

wherein R represents the residue of a member selected from the group consisting of an aryl nucleus of the benzene series and a benzothiazole nucleus, and $R_3$ represents the residue of a member selected from the group consisting of a tetronic and a tetramic acid.

6. A cellulose acetate colored with a nuclear non-sulfonated azo dye compound having the general formula:

$$R-N=N-R_3$$

wherein R represents the residue of an aryl nucleus of the benzene series and $R_3$ represents the residue of a member selected from the group consisting of a tetronic acid and a tetramic acid.

7. A cellulose acetate colored with a nuclear non-sulfonated azo dye compound having the general formula:

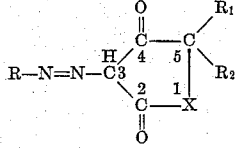

wherein R represents the residue of an aryl nucleus of the benzene series, $R_1$ and $R_2$ each represents a member selected from the group consisting of hydrogen, an alkyl group, an allyl group, a benzene nucleus, a naphthalene nucleus, a cycloalkyl group and a furyl group and X represents a member selected from the group consisting of O and NH.

8. A cellulose acetate colored with a nuclear non-sulfonated azo dye compound having the general formula:

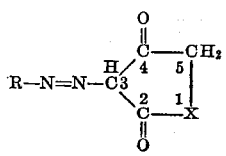

wherein R represents the residue of an aryl nucleus of the benzene series, X represents a member selected from the group consisting of O and NH and wherein each of the hydrogen atoms in the position numbered 5 may be replaced by an alkyl group.

JOSEPH B. DICKEY.
JOHN R. BYERS, Jr.